United States Patent
Blum

(10) Patent No.: US 7,482,394 B2
(45) Date of Patent: Jan. 27, 2009

(54) ANTIFOULING COATING

(75) Inventor: Holger Blum, Hamburg (DE)

(73) Assignee: Chemical Investment Ltd., Gibraltar (GB)

( * ) Notice: Subject to any disclaimer, the term of this patent is extended or adjusted under 35 U.S.C. 154(b) by 685 days.

(21) Appl. No.: 10/507,124

(22) PCT Filed: Feb. 4, 2003

(86) PCT No.: PCT/EP04/01032

§ 371 (c)(1),
(2), (4) Date: Sep. 10, 2004

(87) PCT Pub. No.: WO2004/069940

PCT Pub. Date: Aug. 19, 2004

(65) Prior Publication Data

US 2005/0171234 A1    Aug. 4, 2005

(30) Foreign Application Priority Data

Feb. 5, 2003    (EP) .................................. 03002539

(51) Int. Cl.
*C09D 5/16* (2006.01)
*C04B 26/10* (2006.01)

(52) U.S. Cl. .................. 523/122; 524/174; 524/176; 524/593

(58) Field of Classification Search ............... 523/122
See application file for complete search history.

(56) References Cited

U.S. PATENT DOCUMENTS 6,284,433 B1 * 9/2001 Ichikawa et al. ............ 430/303

FOREIGN PATENT DOCUMENTS

JP    08-053633 A   *   2/1996

OTHER PUBLICATIONS

Machine translation of JP 08-053633 A, Feb. 1996.*

* cited by examiner

*Primary Examiner*—Vasu Jagannathan
*Assistant Examiner*—Vickey Ronesi
(74) *Attorney, Agent, or Firm*—Reed Smith LLP; Stanley P. Fisher, Esq.; Juan Carlos A. Marquez

(57) ABSTRACT

This invention provided a high-build, self-polishing marine antifouling paint which affords a coated film having antifouling properties for a long period of time. The paint binder which is a fiber reinforced aldehyde resin comprises two synergistically acting components, Component A and Component B. Component A an aluminium di-sec-alkoxide acetoacetic ester chelate is represented by the following formula (1): $(R^1O)_2-Al-(CH_3-CO-CH_2-CO-O-R^2)$ wherein $R^1$ represents an sec.-alkyl group having 3 to 10 carbon atoms, or a cycloalkyl group; and $R^2$ represents an alkyl group having 1 to 10 carbon atoms, or a cycloalkyl group. Component B a monoalkoxy organo-titanate0IV is represented by the following formula (II): $R^3-O-Ti(-X)3$ wherein $R^3$ is a monovalent organic group having from 2 to 30 carbon atoms or a substituted derivative thereof X in the above formulae independently represents an acylate group, a sulfonic acid reside, a phosphoric acid residue or a pyrophosphoric ester residue, or a mixture thereof.

5 Claims, No Drawings

ANTIFOULING COATING

The invention relates to antifouling coatings.

An antifouling coating is used as top coat on ship's hull or other underwater structure to inhibit the settlement and growth of marine organisms such as barnacles and algae, generally by release of a biocide for the marine organisms.

A marine structure such as ship's bottom, port installations, buoys, pipelines, bridges, submarine bases, aquaculture nets, fixed shore nets, installations related to submarine oil fields, conducting tubes or intake works of power stations, breakwaters or ship anchors are fouled by fouling aquatic organisms such as barnacles, shellfish, bryozoan, algae and the like, leading to significant economic loss.

In order to prevent settlement of such fouling aquatic organisms, the marine structure is generally coated with an antifouling paint, which is mainly prepared from an antifoulant of an inorganic copper compound.

A soluble matrix antifouling paint contains rosin as the main part of its paint binder, and the antifoulant is blended with the same, in order to prevent settlement of fouling aquatic organisms.

Although rosin is a cheap and easily available raw-material its drawback are its easy degradation by air whereby the molecular structure is altered and thereby the polishing rate of the paint is lowered to such an extend that seldom more than 18 to 24 months of usable operating-time is possible. Even where low self-polishing rates are adequate to bring out sufficient biocide action, the unavoidable rosin oxidation also causes a mechanical deterioration of the antifouling paint causing their premature failure.

One way to increase the usable life time of soluble matrix antifouling paints is to make rosin a minor constituent of the paint binder. Scheiber, J.; Sändig, K. (1929) *Die künstlichen Harze*, Stuttgart, Wissenschaftliche Verlagsgesellschaft m.b. H p. 205 reported good results from the use of an antifouling paint which gradually dissolves in sea water, based on a fiber-reinforced aldehyde resin binder which comprisied rosin as minor ingredient. Specifically Scheiber and Sändig's antifouling paint binder formula consisted of WACKER SCHELLAC EWC an acetaldehyde resin plasticised with about 14 parts per 100 resin with tricresylphosphate and hydrophobised with about 3 to 6 parts wax per 100 parts of aldehyde resin. Rosin (undistilled) was part of the aldehyde paint binder in form of turpentine. Natural turpentine typically consists of 75-85% solid material—which form rosin after distillation —and of 25 to 15% volatile terpene solvent.

Thus Scheiber and Sändig described an well working antifouling paint of the following (averaged) composition:

SCHEIBER and SÄNDIGs FORMULA

| | |
|---|---|
| Aldehyde resin (paint binder,) | 10.1 parts |
| Asbestos, milled (fiber reinforcement) | 6.3 parts |
| Tricresylphosphate (plasticiser) | 1.5 parts |
| Wax (film consumption regulator) | 0.3 parts |
| Rosin (undistilled ex turpentine) | 5.0 parts |
| Ethanol plus terpene distillates (solvent) | 43.5 parts |
| Zink oxide (toxic pigment) | 11.7 parts |
| Iron oxide (pigment dye) | 6.9 parts |
| Zinc dust 2 parts and other toxic pigments | 14.7 parts |

The above paint composition could be considered as physico-mechanical optimized because, given the volume ratio of—still relatively brittle—organic binder composition/ total inorganic pigment the above figured volume concentration of asbestos fiber reinforcement is well within the optimum range of 2 to 9 Vol % recommended to toughen brittle composites. See, for example in Beaudoin James J. (1990) *Handbook of fiber-reinforced Concrete*, New Jersey, Noyes Publication (ISBN 0-8155-1236-8), pp 1-46 and pp 206-262 and pp 309-322.

Careful re-examination revealed that this paint composition gave high-build antifouling paints of superior mechanical qualities and without any tendency to crack or peel under adverse long-term weathering conditions. Other mineral or organic fibers could be substituted for the milled asbestos without loss in flexibility and impact resistance of this remarkable coating formula.

On the side of the antifouling performance the Scheiber and Sändig formula worked well when mercury-oxide HgO or tributyl-tin-fluoride was used as "other toxic pigment", both these substances are now completely banned from use in antifouling paints.

However, when cuprous oxide, copper-I-thiocyanate or copper-pyrithione was used in Scheiber and Sändig's formula as "other toxic pigment" a sort of slow chemical reaction took place between the aldehyde resin and the copper-compound and the useful antifouling performance of 350-400 μm coatings did not exceed more than 18-20 months immersion time. This negative result was independent of whether or not there was any rosin in the paint.

German Patent 394 946 proposes a method to improve aldehyde resins by heating them with small amounts of a metal hydroxide for example with aluminum hydroxide. However, when the untreated aldehyde resin in the Scheiber and Sändig Formula was replaced by any of the metal-hydroxde pre-treated aldehyde resins as proposed by the above patent, no lasting improvement in antifouling capability was obtained and the coating film properties were inadequate, and blistering or peeling was likely to occur.

The objective of the present invention is to provide an fiber reinforced aldehyde binder based anti-fouling paint composition which resolves the above-said specific problems. A further object of the present invention is to provide an high-build antifouling coating composition capable of forming a coating film being excellent in antifouling properties after long term exposure to in dry atmosphere, for example, above drafts of hulls and also in atmosphere in which immersion in the seawater and exposure to dryness alternate with each other because fouling can be inhibited to a level of practically no significance.

The present inventor has conducted extensive studies and, as a result, found that the above object of the present invention is accomplished by a fiber-reinforced aldehyde resin antifouling paint binder containing two specific binder-soluble metal-organic compounds. The present invention has been completed based on this finding.

Thus, the present invention provides an antifouling coating composition comprising: (a) a vehicle comprising a fiber reinforced aldehyde resin, a binder soluble aluminum di-sec-alkoxide acetoacetic ester chelate (Compound A) and a binder soluble monoalkoxy organo-titanate-IV Compound (B), and (b) antifouling marine biocides and other paint additives. An aldehyde resin binder for a fiber reinforced antifouling paint or paint base comprises: a) 2 to 20 parts by weight per 100 parts by weight of aldehyde resin of an aluminum di-secalkoxide acetoacetic ester chelate (Component A) represented by the following formula (I): $(R^1O)_2$—Al—$(CH_3$—CO—$CH_2$—CO—O—$R^2)$ wherein $R^1$ represents a secalkyl group having 3 to 10 carbon atoms or a cycloalkyl group; and $R^2$ represents an alkyl group having 1 to 10 carbon atoms or a cycloalkyl group; and b) 0.5 to 8 parts by weight per 100 parts by weight of aldehyde resin of a monoalkoxy organotitanate- IV (Component B) represented by the following formula (II): $R^3$—O—Ti(—X)$_3$, wherein $R_3$ is a monovalent organic group having from 2 to 30 carbon atoms or a substituted derivative thereof; X in the above formula independently represents an acylate group, a sulfonic acid residue, a phosphoric acid residue or a pyrophosphoric ester residue, or a mixture thereof, and wherein the total amount of said aldehyde resin plus said Component B is between about 15% and about 45% based upon the total weight of the paint or paint base composition. In the aldehyde resin binder, the total amount of said aldehyde resin plus said Component A is between about 15% and about 45% based upon the total weight of the paint or paint base composition.

This anti-fouling paint composition demonstrates improved anti-fouling properties by virtue of its constant erosion rate over a long term, storage stability and durability of the formed paint film. Moreover, it can be recoated by virtue of its excellent adhesion property.

The antifouling agent according to the present invention gives rise to no environmental problems. That is, it has low toxicity and low retentivity in bodies and exerts its effects over a long period of time without adversely affecting the ecosystem or the working environment.

The applicant has now unexpectedly found that by using two specific components A plus B, the aldehyde resin's slow interaction with copper marine biocides is completely suppressed resulting in a long term antifouling capability. This is really unexpected since the prior art does not teach or provide any method to counteract the aldehyde resin's reaction with copper based pigments. Thus the antifouling paint composition of the present invention consists of the following components and ingredients:

1) Component A

The Component A used as an essential component in the present invention is an aluminum di-sec-alkoxide acetoacetic ester chelate. Component A is represented by the following formula:

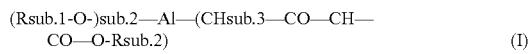

(R$_1$-O-)$_2$—Al—(CH$_3$—CO—CH—CO—O-R$_2$)     (I)

wherein Rsup.1 represents an sec.-alkyl group having 3 to 10 carbon atoms, or a cycloalkyl group; and R$_2$ represents an alkyl group having 1 to 10 carbon atoms, or a cycloalkyl group.

As examples of commercially available aluminum di-sec-alkoxide acetoacetic ester chelate can be mentioned:

Aluminum di(isopropoxide) acetoacetic ethylester chelate CAS#14782-75-3 Technical Grade Al %=9,6 min Aluminum di(sec-butoxide) acetoacetic ethylester chelate CAS#24772-51-8 Technical Grade Al %=8,4 min 2) Component B The Component B a monoalkoxy organo-titanate-IV is used as the other essential component in the coating composition of the present invention. Component B is represented by the following formula:

R$_3$—O—Ti(—X)$_3$     (II)

wherein R$_3$ is a monovalent organic group having from 2 to 30 carbon atoms or a substituted derivative thereof; X in the above formulae independently represents an acylate group, a sulfonic acid residue, a phosphoric acid residue or a pyrophosphoric ester residue, or a mixture thereof.

Examples of commercially available monoalkoxy organo-titanate-IV compounds useful for the present invention are:

Titanium IV 2-propanolato, tris isooctadecanoato-O CAS#61417-49-0 sold as KEN-REACT® TTS by Kenrich Petrochemicals, Inc.

Titanium IV 2-propanolato, tris (dodecyl)benzenesulfanato-O sold as KEN-REACT® 9S by Kenrich Petrochemicals, Inc Titanium IV 2-propanolato, tris (dioctyl)phosphato-O CAS#68585-79-5 sold as KEN-REACT® 12 by Kenrich Petrochemicals, Inc Titanium IV 2-propanolato, tris (dioctyl)pyrophoshato-O CAS#67691-13-8 sold as KEN-REACT® 38S by Kenrich Petrochemicals, Inc Titanium IV 2,2(bis 2-propenolatomethyl) butanolato tris neodecanoato-O sold as LICA® 01 by Kenrich Petrochemicals, Inc Titanium IV 2,2(bis 2-propenolatomethyl) butanolato tris (dodecyl)benzenesulfanato-O sold as LICA® 09 by Kenrich Petrochemicals, Inc Titanium IV 2,2(bis 2-propenolatomethyl) butanolato tris (dioctyl)phosphato-O sold as LICA® 12 by Kenrich Petrochemicals, Inc Titanium IV 2,2(bis 2-propenolatomethyl) butanolato tris (dioctyl)pyrophoshato-O sold as LICA® 38 by Kenrich Petrochemicals, Inc 3) Aldehyde Resin Aldehyde resins are easily prepared by the alkaline autocondensation of acetaldehyde, propionaldehyde, butyaldehydes or mixtures of these aldehydes.

Aldehyde resins useful as vehicle in the present invention are preferably prepared by alkaline condensation of starting compounds of the general formula Ra—CH—(OH)—Rb—CH=O, where Ra and Rb are non-aromatic organic residues thereby conducting the condensation with elimination of water and other volatile substances in such a way that the final product of condensation preferably contains about 4 to 6 carbon atoms per oxygen atom present in the resin molecule.

4) Fiber Reinforcement.

Inorganic or organic fibers with an aspect ratio of greater than 15 and an Emoldulus greater than about 60.000 N/nmm2 are useful as reinforcing component of the antifouling paint composition of the present invention.

Milled asbestos and other high-modulus fibers are long known as reinforcing paint fillers providing improvements in flexural modulus, elongation, tensile strength in hull paints and their use is well documented in the paint literature and in patents.

Milled asbestos is ingredient in Scheiber and Sändig's (1929) antifouling paint formula. Hadert, H. (1952) *Neues Rezeptbuch für die Farben-und Lackindustrie* 1.Band, Hannover, Curt R. Vincentz Verlag on page 371 describes an antifouling marine paint based on Australian patent 22 262 with a linseed-oil binder reinforced with 21% milled asbestos. *The Chemical Formulary* (1951, p. 389) describes a hull paint with 11% asbestos fiber as reinforcement. Morgans, W. M.(1984) *Outlines of Paint Technology* Volume 1: Materials [first published in 1969] Charles Griffin and Company, High Wycombe England on page 76 states that "asbestos increases the mechanical strength of certain types of paint film".

The use of mineral fiber reinforcement with diameters less than 1µ is now banned in many areas of use today due to health concerns and therefore a number of other inorganic and organic fibers are used as asbestos substitute:

Römpp H, (1988) *Chemie-Lexikon* 6.Ed (Stuttgart, Franckh Verlag) ISBN 3-440-04510-2 describes under the entry "Wollastonit" that Wollastonite, a calcium silicate fiber is a recommended replacement for asbestos. Milled mineral wool in its frayness resembles milled asbestos fiber. In U.S. Pat. No. 5,008,146 (1989) carbon fiber with length <1000μ, is used in a calcium rosinate and zinc rosinate based antifouling paint. "Chopped graphite fibers is added to the formulation to assist in achieving a tough durable coating". Carbon fiber's modulus of elasticity resembles that of asbestos but—as an advantage—carbon fiber has only about half the density of asbestos fiber so that to achieve the toughening effect of asbestine only about half the weight amount is needed when carbon fiber is used.

Due to the systematic research performed during the 70's and early 80's in the field of polymer cement fiber reinforcement, engineering mathematical expressions are available to calculate the type and amount of fiber reinforcement which is needed to make brittle paint binder matrixes impact resistant and more or less flexible. See for example Beaudoin James J.(1990) *Handbook of fiber-reinforced Concrete*, New Jersey, Noyes Publication ISBN 0-8155-1236-8; *Composite Encyclopedia* (1993), Vol 1-8, New York; De, S. K.; White J. R. (eds.), *Short fiber-polymer Composites*, Woodland Publishing Ltd., 1996; and Kardos, J. L., *Short Fiber Reinforcement Polymer Composites, Structure-Property Relations*, in *International Encyclopedia of Composites*, Vol.5, Ed, by s. M. Lee, VCH, New York, 1991.

The antifouling paint composition according to the present invention may contain the following conventional additives:

(5) Antifouling Agent:

Powders or flakes of copper, zinc and nickel; oxides, hydroxides, halides or other salts of copper and zinc, particularly cuprous oxide or copper rhodanide; biocidal metal carboxylates such as zinc naphtenate, copper naphenate or copper stearate; metal (e.g. Na, K, Zn, Pb, Cu, Fe, Ni, Mg, Se) dithiocarbamates such as zinc dimethyldithiocarbamate, zincbis-(dimethyldithiocarbamate) or zinc ethylenebis-dithiocarbamate; thiuram disulfides such as tetramethylthiurum disulfide; sulfamides such as phthalysulfathiazole, sulfaethyldole, sulfanilidopyridine, sulfamethoxyine or N,N'-dimethyl-N'-phenyl-N-fluorodichloromethylthio-sulfamide; pyrrole and imidazole compounds such as glyodine, fentizole or polycide; thioxane and thioxathone compounds such as tetrazol, asterol or mylone; imide and amide compounds such as nicarbazin, 3,4,5-tribromosalicylanilide, Ntrichloromethyl-mercaptophthalimide, 3,5-dinitrobenzamide, 2,4,6-trichloromaleimide or N-fluorodichloromethylthiophthalimide; sulfur- or halogen-containing organic compounds such as 2-methylthio-4-tbutylamino-6 -cyclopropylamino-s-triazine, 2,4,5,6-tetrachlorophthalonitrile, N,N'-dimethyl-N-dichlorophenylurea, 4,5-dichloro-2-n-octyl-3-(2H) isothiazoline, 2-pyridinethiol-1-oxide zinc, 2-pyridinethiol-1-oxide copper, 2,3,5,6-tetrachloro-4 -methylsulfonylpyridine, 3-iode-2-propylbutylcarbamate or diiodomethyl p-tolylsulfone; and other known antifouling agents, pesticides, bacteriocides and fungicides.

(6) Plasticizer;

Phthalate plasticizers such as dioctyl phthalate, dimethyl phthalate or dicyclohexyl phthalate; aliphatic dicarboxylate plasticizers such as diisobutyl adipate or butyl sebacate; glycol ester plasticizers such as diethylene glycol dibenzoate or pentaerythritol alkanoic ester; phosphate plasticizers such as tricresyl phosphate or trichloroethyl phosphate; epoxy plasticizers such as epoxydized soybean oil or epoxydized octyl stearate; and other plasticizers such as trioctyl trimellitate or triacetin.

(7) Film Consumption Regulator:

Chlorinated paraffin, oil, wax, vaseline and liquid paraffin, polyvinyl ether, polypropylene sebacate, partially hydrogenated terphenyl, polyvinyl acetate, polyalkyl (meth)acrylate, alkyd resin, polyester resin, polyvinyl chloride, silicone, epoxy resin, polyurethane resin, urea resin and other hydrophobic polymers having satisfactory compatibility and a low glass transition temperature as for example disclosed in Japanese Patent 85 28 456 or the Japanese Patent 50 135 125, which retard the rate of dissolution of the paint.

(8) Pigment:

Extender pigments such as precipitated barium sulfate, talc, clay, chalk, silica white, alumina white or bentonite; color pigments such as titanium dioxide, zirconium dioxide, basic lead sulfate, tin oxide, carbon black, graphite, red iron oxide, chromium yellow, emerald green, phthalocyanine blue or quinacridone.

(9) Solvent:

Hydrocarbons such as xylene, toluene, ethylbenzene, cyclopentane, octane, heptane, cyclohexane or white spirit; ethers such as dioxane, tetrahydrofuran, ethylene glycol monomethyl ether, ethylene glycol monoethyl ether, ethylene glycol dimethyl ether, ethylene glycol monobutyl ether, ethylene glycol dibutyl ether, diethylene glycol monomethyl ether or diethylene glycol monoethyl ether; esters such as butyl acetate, propyl acetate, benzyl acetate, ethylene glycol monomethyl ether acetate or ethylene glycol monoethyl ether acetate; ketones such as methyl isobutyl ketone or ethyl isobutyl ketone; and alcohols such as n-butanol or propyl alcohol.

(10) Other Additives Which Promote Film Consumption:

Monobasic cyclic organic acids such as rosin, monobutyl phthalate or monooctyl succinate; oleic acid and castor oil acid. When chalk is used as the extender pigment the calcium salts of the said monobasic acids should preferably be used instead.

The antifouling paint composition of the present invention may be prepared by the method known per se in the art. Any known machine such as ball mills, pebble mills, roll mills or sand grind mills may be used for mixing various ingredients.

Paint films of the antifouling paint of the present invention applied on ships, fish nets or marine structurals will be gradually hydrolyzed and disolved in the weakly mineral atmosphere of sea water. Accordingly, the antifouling paint of the present invention may produce, when applied onto ships, a film having excellent performance in terms of controlled antifouling effect for a long period of time. Thus, the antifouling paint of the invention finds use in ships such as tankers, ferry boats, fishing boats, steel boats, wood boats and FRP boats but also marine structurals, fish nets and sea water conduits.

In the following production examples and comparative examples, all parts and percents are by weight unless otherwise indicated.

Production of Vehicle Resin

Aldehyde resins useful as vehicle in the present invention are preferably prepared by alkaline condensation of starting compounds of the general formula Ra—CH—(OH)—Rb—CH=O, where Ra and Rb are non-aromatic organic residues thereby conducting the condensation with elimination of water and other volatile substances in such a way that the final product of condensation preferably contains about 4 to 6 Carbon atoms per oxygen atom present in the resin molecule.

Aldehyde Resin A

A reactor equipped with a stirrer, reflux condenser head, nitrogen gas tube and decanter was charged with 1000 parts of technical, water stabilized 3-hydroxybutyraldehyde CAS#107-89-1, of the following composition:

| | |
|---|---|
| 3-hydroxy-butyraldehyde | 75% |
| acetaldehyde | 7% |
| crotonaldehyde | 1% |
| water | 17% |
| Total | 100% |

To this was added a solution of 11 parts of diethylamine in 66 parts of water. The unit is set for reflux at atmospheric pressure, heat is applied at a moderate rate and the mixture is heated under nitrogen to reflux for about 4 hours.

The reflux head is now removed and heating is continued thereby distilling off water formed by the reaction but returning all oily material collected in the decanter back into the reactor. As soon as the temperature of the liquid mass has reached 180 deg Celsius it was kept at that temperature for further 7 hours and thereafter with continuation of stirring and nitrogen gas feeding, the molten resin batch was heated to 186 deg Celsius and kept there for further 45 minutes while sparging nitrogen through the molten resin and distilling off about 28 parts of oily material which was discarded.

The molten resin was then fed from the reactor to a water-cooled rotating drum cooler to obtain 627 parts (98% yield) of, yellowish "Aldehyde Resin A" flakes with a softening point of 105 to 110 deg Celsius.

The following examples depict in more detail the preparation of representative anti-fouling paint compositions and methods of their application in accord with the principles of the present invention, but are not intended to limit the scope of the invention in any aspect.

In the following examples pbw means parts by weight. Turpentine 77% was of natural portugese origin and was analyzed to have 23% of volatile terpene distillates. Asbestine was prepared by wet milling of Canadian asbestos under butylacetate. Copper pyrithione CAS#14915-37-8 was prepared by adding a sodium pyrithione 40%-solution in water to a 5% solution of copper-II-acetate in water and collection the olive-green precipitate on a filter followed by repeated washing with water and finally drying in vacuum. Rosin WW was of portugese origin. Calcium rosinate CAS#9007-13-0 had an acid value of 50 mg KOH/gram.

EXAMPLE 1

Paint preparation: 101 pbw of Aldehyde Resin A was dissolved in 101 pbw butylacetate to give 202 pbw of a 50,0% solution. To this solution was added 8 pbw aluminum di(isopropoxide) acetoacetic ethylester chelate (Compound A), 15 pbw of tricresylphoshate and 6 pbw titanium IV 2-propanolato, tris (dioctyl)phosphato-O (Compound B) and the solution was stirred for one hour. Thereafter the solution was mixed with zinc oxide 117 pbw, and 69 pbw iron oxide (red) CAS# 1309-37-1, and 350 pbw dicopperoxide Cu2O, and 30 pbw copper pyrithione and milled overnight and then finally blended with 65 pbw turpentine (77% solids ex native Portugal) and 3 pbw Montan wax and 63 pbw asbestine, and a further 340 pbw of butylacetate.

Evaluation of the Anti-fouling Properties:

The paint thus obtained was tested for antifouling activity by applying it with a dry film thickness of 360 to 400 μm to a plaque over a vinyl resin/tar anti-corrosive paint, mounting the plaque on a panel and immersing the panel from a raft in the Reiherstieg port of Hamburg, Germany. After 30 months immersion no weed or animal fouling was observed on the plaque coated with the paint of example#1, and algal slime was practically nonexistent.

This antifouling paint preparation resembles the original Scheiber and Sändig formula but its antifouling properties are improved through addition of Compounds A and B, see comparative example D1 further below.

EXAMPLE 2

Paint preparation: 100 pbw of Aldehyde Resin A was dissolved in 100 pbw butylacetate to give 200 pbw of a 50,0% solution. To this solution was added 4 pbw aluminum di(isopropoxide) acetoacetic ethylester chelate (Compound A), 20 pbw of tricresylphoshate and the solution was stirred for one hour. Thereafter the solution was mixed with copper thiocyanate 500 pbw, and 3 pbw titanium IV 2-propanolato, tris (dodecyl)benzenesulfanato-O (Compound B), and 30 pbw copper pyrithione and milled overnight and then finally blended with 50 pbw rosin ww and 30 pbw chopped carbon fiber of 250 μm length, and a further 160 pbw of butylacetate.

Evaluation of the Antifouling Properties:

The paint thus obtained was tested for antifouling activity by applying it with a dry film thickness of 360 to 400 μm to a plaque over a vinyl resin/tar anti-corrosive paint, mounting the plaque on a panel and immersing the panel from a raft in the Reiherstieg port of Hamburg, Germany. After 36 months immersion no weed or animal fouling was observed on the plaque coated with the paint of Example#2, and algal slime was practically nonexistent.

EXAMPLE 3

Paint preparation: 100 pbw of Aldehyde Resin A was dissolved in 100 pbw butylacetate to give 200 pbw of a 50,0% solution. To this solution was added 7 pbw aluminum di(sec-butoxide) acetoacetic ethylester chelate (Compound A), 20 pbw of tricresylphoshate and 6 pbw titanium IV 2-propanolato, tris (dioctyl)pyrophoshato-O (Compound B) and the solution was stirred for one hour. Thereafter the solution was mixed with 350 pbw dicopper oxide Cu2O, and 150 pbw calcium carbonate CAS# 1317-65-3 and 30 pbw copper pyrithione and milled overnight and then finally blended with 60 pbw calcium rosinate and 30 pbw chopped carbon fiber of 250 μm length, and a further 150 pbw of butylacetate.

Evaluation of the Antifouling Properties:

The paint thus obtained was tested for antifouling activity by applying it with a dry film thickness of 360 to 400 μm to a plaque over a vinyl resin/tar anti-corrosive paint, mounting the plaque on a panel and immersing the panel from a raft in the Reiherstieg port of Hamburg, Germany. After 36 months immersion no weed or animal fouling was observed on the plaque coated with the paint of Example#3, and algal slime was practically nonexistent.

EXAMPLES 4 to 12

Productive examples of antifouling coating compositions were formed similarly to Example 1 to 3 in accordance with the formulations specified in Tables 1 (the amount of each component is expressed by "parts by weight")

In Table 1 poly-methylacrylate is a homopolymer of acrylic acid methyl ester of 40000 mean molecular weight. Aluminium-chelate1 is aluminum di(isopropoxide) acetoacetic ethylester chelate. Aluminium-chelate2 is aluminum di(sec-butoxide) acetoacetic ethylester chelate. Titanium-Compound 1 is titanium IV 2-propanolato, tris (dioctyl)phosphato-O. Titanium-Compound 2 is titanium IV 2-propanolato, tris isooctadecanoato-O. Titanium-Compound 3 is titanium IV 2-propanolato, tris (dioctyl)pyrophosphato-O Titanium-Compound 4 is titanium IV 2-propanolato, tris (dodecyl)benzenesulfanato-O Titanium-Compound 5 is titanium IV 2-butanolato, tris (dioctyl)phosphato-O. Titanium-Compound 6 is titanium IV 2-butanolato, tris isooctadecanoato-O

TABLE 1

| | Example# | | | | | | | | |
|---|---|---|---|---|---|---|---|---|---|
| | 4 | 5 | 6 | 7 | 8 | 9 | 10 | 11 | 12 |
| Aldehyde resin A | 10 | 10 | 10 | 10 | 10 | 14 | 16 | 8 | 10 |
| Tricresylphoshate | 2 | 2 | | 2 | 2 | | | 3 | 2 |
| Poly-methylacrylate | | | 3 | | | 5 | | | |
| Aluminium-Chelate1 | 0.2 | 0.2 | | | | 0.3 | | 0.4 | 0.4 |
| Aluminium-Chelate2 | | | 1 | 0.4 | 2 | | 1.5 | | |
| Titanium-Compound 1 | 0.2 | | | | | | | | |
| Titanium-Compound 2 | | 0.2 | | | | 0.7 | | 0.4 | |
| Titanium-Compound 3 | | | | 0.3 | | | | | |
| Titanium-Compound 4 | | | 0.4 | | | | | | |
| Titanium-Compound 5 | | | | | 0.3 | | 0.5 | | |
| Titanium-Compound 6 | | | | | | | | | 0.2 |
| Carbon fiber 250 μ | 3 | 3 | 2 | 3 | 2 | 1 | 3 | 2 | 4 |
| Turpentine 77% solids | 7 | | | 9.3 | | 8 | | | |
| Rosin WW | | | 5 | | 6 | | | | 5 |
| Calcium rosinate (AV 50) | | 6 | | | | | | 8 | |
| Dicopperoxide Cu2O | 35 | 36 | | 47 | 40 | | 35 | 45 | 40 |
| Copper-I-Thiocyanate CuSCN | | | 50 | | | 45 | | | |
| Copper-Pyrithione CuPT | 3 | 3.6 | 3 | 2 | 4 | 5 | 4 | 5 | 5 |
| Zinc-Oxide ZnO | 17 | | | | 12 | | 10 | | 10 |
| Caliumcarbonate CaCO3 | | | 14 | | | | | 6 | |
| Butylacetate | 22.6 | 25 | 25.6 | 26 | 21.7 | 26 | 25 | 22.2 | 23.4 |
| Total | 100 | 100 | 100 | 100 | 100 | 100 | 100 | 100 | 100 |
| %-Biofouling after 18 months | 0 | 0 | 0 | 0 | 0 | 0 | 0 | 0 | 0 |
| %-Biofouling after 24 months | 0 | 0 | 0 | 0 | 0 | 0 | 0 | 0 | 0 |
| %-Biofouling after 30 months | 0 | 0 | 0 | 0 | 0 | 0 | 0 | 0 | 0 |
| %-Biofouling after 36 months | 0 | 0 | 0 | 0 | 0 | 0 | 0 | 0 | 0 |

COMPARATIVE EXAMPLE D1

Paint preparation: 101 pbw of Aldehyde Resin A was dissolved in 101 pbw butylacetate to give 202 pbw of a 50,0% solution. Thereafter the solution was mixed with 15 pbw of tricresylphoshate, zinc oxide 117 pbw, and 69 pbw iron oxide (red) CAS# 1309-37-1, and 350 pbw dicopperoxide Cu2O, and 30 pbw copper pyrithione and milled overnight and then finally blended with 65 pbw turpentine (77% solids ex native Portugal) and 3 pbw Montan wax and 63 pbw asbestine, and a further 340 pbw of butylacetate.

Evaluation of the Anti-fouling Properties:

The paint thus obtained was tested for antifouling activity by applying it with a dry film thickness of 360 to 400 μm to a plaque over a vinyl resin/tar anti-corrosive paint, mounting the plaque on a panel and immersing the panel from a raft in the Reiherstieg port of Hamburg, Germany. After 18 months immersion a 15% coverage with algae, weed and animal fouling was observed on the plaque coated with the paint of Example#D1 Comparative Examples D2 to D7 Antifouling coating compositions were formed similarly to Comparative Example 1 in accordance with the formulations specified in Table 2 (the amount of each component is expressed by "parts by weight")

TABLE 2

| | Comparative Example# | | | | | |
|---|---|---|---|---|---|---|
| | D2 | D3 | D4 | D5 | D6 | D7 |
| Aldehyde resin A | 10 | 10 | 10 | 10 | 10 | 10 |
| Tricresylphoshate | 2 | 2 | 2 | 2 | 2 | 2 |
| Poly-methylacrylate | | | | | | |
| Aluminium-Chelate1 | | | | | 0.5 | |
| Aluminium-Chelate2 | | | | | | 0.5 |
| Titanium-Compound 1 | | | | | | |
| Titanium-Compound 2 | 0.2 | | | | | |
| Titanium-Compound 3 | | 0.4 | | | | |
| Titanium-Compound 4 | | | 0.2 | | | |
| Titanium-Compound 5 | | | | | | |
| Titanium-Compound 6 | | | | | | |
| Carbon fiber 250 μ | 4 | 3 | 2 | 3 | 1 | 4 |
| Turpentine 77% solids | | | | 7.8 | | |
| Rosin WW | 5 | | 5 | | 5 | 5 |
| Calcium rosinate (AV 50) | | 8 | | | | |
| Dicopperoxide Cu2O | 40 | 38 | 40 | | 45 | 40 |
| Copper-I-Thiocyanate CuSCN | | | | 41 | | |
| Copper-Pyrithione CuPT | 5 | 5 | 5 | 8 | 4 | 4 |
| Zinc-Oxide ZnO | 10 | | 8 | | 8.5 | 8.5 |
| Caliumcarbonate CaCO3 | | 11 | | | | |
| Butylacetate | 23.8 | 22.6 | 28 | 28 | 24 | 26 |
| Total | 100 | 100 | 100 | 100 | 100 | 100 |
| %-Biofouling after 18 months | 0 | 0 | 5 | 0 | 0 | 5 |
| %-Biofouling after 24 months | 5 | 0 | 15 | 0 | 15 | 10 |
| %-Biofouling after 30 months | 10 | 5 | 45 | 15 | 45 | 45 |
| %-Biofouling after 36 months | 50 | 20 | 100 | 45 | 100 | 100 |

A fiber reinforced antifouling paint or paint base comprises a) 2 to 20 parts by weight per 100 parts by weight of aldehyde resin of an aluminum di-secalkoxide acetoacetic ester chelate (Component A) represented by the following formula (I): $(R^1O)_2$—Al—$(CH_3$—CO—$CH_2$—CO—O—$R^2)$ and b) 0.5 to 8 parts by weight per 100 parts by weight of aldehyde resin of a monoalkoxy organotitanate-IV (Component B) represented by the following formula (II): $R^3$—O—Ti(—X)$_3$. $R^1$ represents a secalkyl group having 3 to 10 carbon atoms or a cycloalkyl group. $R^2$ represents an alkyl group having 1 to 10 carbon atoms or a cycloalkyl group. $R^3$ is a monovalent organic group having from 2 to 30 carbon atoms or a substituted derivative thereof. X independently represents an acylate group, a sulfonic acid residue, a phosphoric acid residue or a pyrophosphoric ester residue, or a mixture thereof. The total amount of said aldehyde resin plus said Component B is between about 15% and about 45% based upon the total weight of the paint or paint base.

Alternatively, in the fiber reinforced antifouling paint or paint base described above, the total amount of said aldehyde resin plus said Component A is between about 15% and about 45% based upon the total weight of the paint or paint base.

A process for providing a high-build marine antifouling paint or paint base characterized by a fiber-reinforced aldehyde resin as binder and containing metalliferous pigments which are sparingly soluble in seawater comprises the steps of: (a) adding aluminum di-secalkoxide acetoacetic ester chelate (Component A) and thereafter (b) adding monoalkoxy organo-titanate-IV (Component B) to said aldehyde resin to provide a paint or paint base. Said Component A is present in an amount of between about 0.4% and about 4%. Said Component B is present in an amount of between about 0.2% and about 2%. The total amount of said Component A and said Component B is between about 0.5% and about 5% based upon the total weight of the paint or paint base. Said Component A is represented by the following formula (I): $(R^1O)_2$—Al—$(CH_3$—CO—$CH_2$—CO—O—$R^2)$. $R^1$ represents a sec alkyl group having 3 to 10 carbon atoms, or a cycloalkyl group. $R^2$ represents an alkyl group having 1 to 10 carbon atoms, or a cycloalkyl group. Said Component B is represented by the following formula (II): $R^3$—O—Ti(—X)$_3$. $R^3$ is a monovalent organic group having from 2 to 30 carbon atoms or a substituted derivative thereof. X independently represents an acylate group, a sulfonic acid residue, a phosphoric acid residue or a pyrophosphoric ester residue, or a mixture thereof. The total amount of said aldehyde resin plus said Component B is between about 15% and about 45% based upon the total weight of the paint or paint base.

Alternatively, a process for providing a high-build marine antifouling paint or paint base characterized by a fiber-reinforced aldehyde resin as binder and containing metalliferous pigments which are sparingly soluble in seawater which comprises the steps of: (a) adding aluminum di-secalkoxide acetoacetic ester chelate (Component A) and (b) adding monoalkoxy organo-titanate-IV (Component B) to said aldehyde resin to provide a paint or paint base. Said additive Component A is present in an amount of between about 0.4% and about 4%. Said Component B is present in an amount of between about 0.2% and about 2%. The total amount of said Component A and said Component B is between about 0.5% and about 5% based upon the total weight of the paint or paint base. Said Component A is represented by the following formula (I): $(R^1O)_2$—Al—$(CH_3$—CO—$CH_2$—CO—O—$R^2)$. $R^1$ represents a sec alkyl group having 3 to 10 carbon atoms, or a cycloalkyl group. $R^2$ represents an alkyl group having 1 to 10 carbon atoms, or a cycloalkyl group. Said Component B is represented by the following formula (II): $R^3$—O—Ti(—X)$_3$. $R^3$ is a monovalent organic group having from 2 to 30 carbon atoms or a substituted derivative thereof. X independently represents an acylate group, a sulfonic acid residue, a phosphoric acid residue or a pyrophosphoric ester residue, or a mixture thereof. The total amount of said aldehyde resin plus said Component B is between about 15% and about 45% based upon the total weight of the paint or paint base. Steps (a) and (b) are carried out simultaneously.

A fiber reinforced antifouling paint or paint base comprises a binder containing metalliferous pigments which are sparingly soluble in seawater formed by a process which comprises the steps of adding aluminum di-sec-alkoxide acetoacetic ester chelate (Component A) and thereafter adding monoalkoxy organo-titanate-IV (Component B) to aldehyde resin to provide a paint or paint base, and adding one or more auxiliary additive selected from the group consisting of pigments, antisettling agents, plasticizers, solvents, biocides, fibers, stabilizers and film consumption regulators. Said Component A is present in an amount of between about 0.4% and about 4%. Said Component B is present in an amount of between about 0.2% and about 2%. The total amount of said Component A and said Component B is between about 0.5% and about 5% based upon the total weight of the paint or paint base. Said Component A is represented by the following formula (I): $(R^1O)_2$—Al —$(CH_3$—CO—$CH_2$—CO—O—$R^2)$. $R^1$ represents a sec alkyl group having 3 to 10 carbon atoms, or a cycloalkyl group. $R^2$ represents an alkyl group having 1 to 10 carbon atoms, or a cycloalkyl group. Said Component B is represented by the following formula (II): $R^3$—O—Ti(—X)$_3$. $R^3$ is a monovalent organic group having from 2 to 30 carbon atoms or a substituted derivative thereof. X independently represents an acylate group, a sulfonic acid residue, a phosphoric acid residue or a pyrophosphoric ester residue, or a mixture thereof. The total amount of said aldehyde resin plus said Component B is between about 15% and about 45% based upon the total weight of the paint or paint base.

The invention claimed is:

1. A fiber reinforced antifouling paint or paint base, comprising:
    a) 2 to 20 parts by weight per 100 parts by weight of aldehyde resin of an aluminium di-secalkoxide acetoacetic ester chelate (Component A) represented by the following formula (I):
        $(R^1O)_2$—Al—$(CH_3$—CO—$CH_2$—CO—O—$R^2)$ 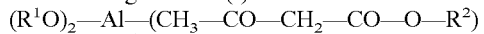
        wherein $R^1$ represents a secalkyl group having 3 to 10 carbon atoms or a cycloalkyl group; and $R^2$ represents an alkyl group having 1 to 10 carbon atoms or a cycloalkyl group; and
    b) 0.5 to 8 parts by weight per 100 parts by weight of aldehyde resin of a monoalkoxy organotitanate-IV (Component B) represented by the following formula (II):

$R^3$—O—Ti(—X)$_3$ 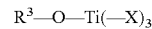

wherein $R^3$ is a monovalent organic group having from 2 to 30 carbon atoms or a substituted derivative thereof; X independently represents an acylate group, a sulfonic acid residue, a phosphoric acid residue or a pyrophosphoric ester residue, or a mixture thereof, and
    wherein the total amount of said aldehyde resin plus said Component B is between about 15% and about 45% based upon the total weight of the paint or paint base.

2. The fiber reinforced antifouling paint or paint base of claim 1, wherein the total amount of said aldehyde resin plus said Component A is between about 15% and about 45% based upon the total weight of the paint or paint base.

3. A process for providing a high-build marine antifouling paint or paint base characterized by a fiber-reinforced aldehyde resin as binder and containing metalliferous pigments which are sparingly soluble in seawater which comprises the steps of:
(a) adding aluminium di-secalkoxide acetoacetic ester chelate (Component A) and thereafter
(b) adding monoalkoxy organo-titanate-IV (Component B) to said aldehyde resin to provide a paint or paint base, said Component A being present in an amount of between about 0.4 % and about 4%, and said Component B being present in an amount of between about 0.2 % and about 2%, the total amount of said Component A and said Component B being between about 0.5 % and about 5% based upon the total weight of the paint or paint base,
wherein said Component A is represented by the following formula (I): $(R^1O)_2$—Al—$(CH_3$—CO—$CH_2$—CO—O—$R^2)$
wherein $R^1$ represents a sec alkyl group having 3 to 10 carbon atoms, or a cycloalkyl group; and $R^2$ represents an alkyl group having 1 to 10 carbon atoms, or a cycloalkyl group,
and said Component B is represented by the following formula (II): $R^3$—O—Ti(—X)$_3$
wherein $R^3$ is a monovalent organic group having from 2 to 30 carbon atoms or a substituted derivative thereof; X independently represents an acylate group, a sulfonic acid residue, a phosphoric acid residue or a pyrophosphoric ester residue, or a mixture thereof, and
wherein the total amount of said aldehyde resin plus said Component B is between about 15% and about 45% based upon the total weight of the paint or paint base.

4. A process for providing a high-build marine antifouling paint or paint base characterized by a fiber-reinforced aldehyde resin as binder and containing metalliferous pigments which are sparingly soluble in seawater which comprises the steps of:
(a) adding aluminium di-secalkoxide acetoacetic ester chelate (Component A) and
(b) adding monoalkoxy organo-titanate-IV (Component B) to said aldehyde resin to provide a paint or paint base, said additive Component A being present in an amount of between about 0.4 % and about 4%, and said Component B being present in an amount of between about 0.2 % and about 2%, the total amount of said Component A and said Component B being between about 0.5 % and about 5% based upon the total weight of the paint or paint base,
wherein said Component A is represented by the following formula (I): $(R^1O)_2$—Al—$(CH_3$—CO—$CH_2$—CO—O—$R^2)$
wherein $R^1$ represents a sec alkyl group having 3 to 10 carbon atoms, or a cycloalkyl group; and $R^2$ represents an alkyl group having 1 to 10 carbon atoms, or a cycloalkyl group, and
said Component B is represented by the following formula (II): $R^3$—O—Ti(—X)$_3$
wherein $R^3$ is a monovalent organic group having from 2 to 30 carbon atoms or a substituted derivative thereof; X independently represents an acylate group, a sulfonic acid residue, a phosphoric acid residue or a pyrophosphoric ester residue, or a mixture thereof,
wherein the total amount of said aldehyde resin plus said Component B is between about 15% and about 45% based upon the total weight of the paint or paint base, and wherein steps (a) and (b) are carried out simultaneously.

5. A fiber reinforced antifouling paint or paint base, comprising a binder containing metalliferous pigments which are sparingly soluble in seawater formed by a process which comprises the steps of adding aluminium di-sec-alkoxide acetoacetic ester chelate (Component A) and thereafter adding monoalkoxy organo-titanate-IV (Component B) to aldehyde resin to provide a paint or paint base, said Component A being present in an amount of between about 0.4% and about 4%, and said Component B being present in an amount of between about 0.2% and about 2%, the total amount of said Component A and said Component B being between about 0.5% and about 5% based upon the total weight of the paint or paint base and, and adding one or more auxiliary additive selected from the group consisting of pigments, antisettling agents, plasticizers, solvents, biocides, fibers, stabilizers and film consumption regulators,
wherein said Component A is represented by the following formula (I): $(R^1O)_2$—Al—$(CH_3$—CO—$CH_2$—CO—O—$R^2)$ wherein $R^1$ represents a sec alkyl group having 3 to 10 carbon atoms, or a cycloalkyl group; and $R^2$ represents an alkyl group having 1 to 10 carbon atoms, or a cycloalkyl group,
and said Component B is represented by the following formula (II): $R^3$—O—Ti (—X)$_3$ wherein $R^3$ is a monovalent organic group having from 2 to 30 carbon atoms or a substituted derivative thereof X independently represents an acylate group, a sulfonic acid residue, a phosphoric acid residue or a pyrophosphoric ester residue, or a mixture thereof, and
wherein the total amount of said aldehyde resin plus said Component B is between about 15% and about 45% based upon the total weight of the paint or paint base.

* * * * *

UNITED STATES PATENT AND TRADEMARK OFFICE
CERTIFICATE OF CORRECTION

PATENT NO. : 7,482,394 B2  Page 1 of 1
APPLICATION NO. : 10/507124
DATED : January 27, 2009
INVENTOR(S) : Blum It is certified that error appears in the above-identified patent and that said Letters Patent is hereby corrected as shown below:

Title Pg, Item (22) please delete:

"Feb. 4, 2003"

and insert:

--Feb. 4, 2004--

Signed and Sealed this

Second Day of June, 2009

JOHN DOLL
*Acting Director of the United States Patent and Trademark Office*